UNITED STATES PATENT OFFICE.

AUGUST E. NIENSTADT, OF BENSONHURST, NEW YORK.

PARAFFIN POWDER AND PROCESS OF MAKING IT.

1,239,618.      Specification of Letters Patent.     Patented Sept. 11, 1917.

No Drawing.     Application filed February 3, 1916.    Serial No. 75,935.

*To all whom it may concern:*

Be it known that I, AUGUST E. NIENSTADT, a citizen of the United States of America, and a resident of Bensonhurst, county of Kings, and State of New York, have invented certain new and useful Improvements in Paraffin Powder and Processes of Making It, of which the following is a specification.

This invention has reference to a novel paraffin paste and powder and the process of producing them. It is the special object of the present invention to produce an aqueous paraffin paste and if the water is removed therefrom a fine dry powder of paraffin remains.

As is well known paraffin is a saturated hydrocarbon of the fatty series and entirely neutral. It is void of chemical affinity as its name indicates and therefore adapted for various uses for which substances being more or less chemically active can not be used.

Heretofore paraffin paper, for instance, has been produced by melting paraffin and coating the paper therewith whereby the paper becomes impervious to water. Very fine paper may be impregnated with the paraffin but heavier paper practically is coated as the paraffin penetrates but slightly the paper mass. Furthermore all paraffin papers have a greasy touch which is undesirable for obvious reasons.

The present invention has for its special purpose to produce reduced paraffin that is reduced to an aqueous paste in which it exists in form of exceedingly fine division. The paste may be diluted with water to any desired degree or the water may be removed therefrom when a fine paraffin powder will result. This aqueous paraffin paste may be mixed with paper pulp in the beater and intimately mixed therein with the pulp so that every particle of paper fiber is covered evenly with the same. The paper pulp, thus impregnated with the paraffin paste then undergoes the usual process of manufacturing paper and when the paper webs finally pass through steam heated rollers the finely divided paraffin within the paper pulp melts and when the paper is perfectly dry it is waterproof or impervious throughout the entire mass and not only on the surface. In fact each fine fiber of the paper is rendered impervious to water and therefore a superior result is obtained and even thick sheets of paper or cardboard are waterproof throughout their entire mass and as perfectly waterproof in the interior portions as on the surface.

In carrying the invention into effect I substantially proceed as follows:

First I prepare a weak solution of an alkali, preferably ammonia water is used, then sufficient stearic acid is added to neutralize the alkali. By boiling the mass a uniform ammonium soap results. A small quantity of the solution of the stearate of ammonium thus obtained is added to melted paraffin kept liquid at as low a temperature as possible. The mixture is stirred until it has cooled off when it forms a paste containing the paraffin in a very finely divided state which paste may be diluted with water. The proportions in which the ammonium stearate is mixed with the melted paraffin may vary within reasonable limit. For obtaining good results a weak soap solution containing from 3 to 5 per cent. of the ammonium stearate is admixed with 97 to 95 per cent. of melted paraffin.

For the purpose of obtaining a fine paraffin powder the water contained in the paraffin paste is evaporated at low heat. The fine powder thus obtained may be used for various purposes, it may be mixed with shaving soap or powder which after use leaves a fine velvety sensation on the skin after shaving.

The paste also may form a component for shaving or other cream for toilet purposes. The creams which are at present in the market are mostly made with stearic acid and borax, they become easily rancid and make the skin dry on account of the free stearic acid contained therein. Creams containing finely divided, practically pure paraffin never become rancid because paraffin is chemically indifferent and does not undergo any chemical change at all under the prevailing conditions.

Paraffin paste or powder may form a component of ordinary toilet or washing soap which greatly improves the same. The paraffin paste or powder further reduces the price of soap considerably and overcomes its bad quality resulting from occurring alkaline character so that the most sensitive skin will not be affected. The paraffin does not weaken the foaming qualities of soaps. The finely divided paraffin in form of paste may be applied to sores, wounds and skin diseases for medicinal purposes to keep out dust and the like.

I claim as my invention:

1. The process of producing paraffin in a finely divided state consisting in melting the paraffin, incorporating therewith a solution containing a small quantity of an alkali stearate, stirring the mixture until cooled off, and removing the solvent of the stearate therefrom.

2. The process of producing paraffin in a finely divided condition consisting in melting paraffin, incorporating therewith of from 3 to 5 per cent. of ammonium stearate in aqueous solution, stirring until the mass has cooled off, and removing the water therefrom to form a fine powder.

3. As a novel product of manufacture paraffin in a finely divided condition composed of paraffin with a little ammonium stearate in a finely divided state, and existing in form of a fine powder.

4. As a novel product of manufacture paraffin in a finely divided condition composed of about 95 to 97 per cent. of paraffin and 5 to 3 per cent. of ammonium stearate and existing in form of a fine dry powder.

Signed at New York, N. Y., this 29 day of January, 1916.

AUGUST E. NIENSTADT.

Witnesses:
LILLEY SCHMIDT,
SOPHIE GRIB.